United States Patent [19]

Sung et al.

[11] Patent Number: 4,810,261
[45] Date of Patent: * Mar. 7, 1989

[54] REACTION PRODUCT ADDITIVE AND ORI-INHIBITED MOTOR FUEL COMPOSITION

[75] Inventors: Rodney L. Sung; Milton D. Behrens, both of Fishkill; Michael A. Caggiano, Chelsea, all of N.Y.; John F. Knifton, Austin, Tex.; John M. Larkin, Austin, Tex.; Robert L. Zimmerman, Austin, Tex.

[73] Assignee: Texaco Inc., White Plains, N.Y.

[*] Notice: The portion of the term of this patent subsequent to May 31, 2005 has been disclaimed.

[21] Appl. No.: 158,424

[22] Filed: Feb. 19, 1988

Related U.S. Application Data

[63] Continuation-in-part of Ser. No. 230, Jan. 2, 1987, abandoned.

[51] Int. Cl.$^4$ ............................................. C10L 1/22
[52] U.S. Cl. .................................... 44/62; 44/63; 44/71; 528/340
[58] Field of Search .................. 44/62, 63, 71; 528/340

[56] References Cited

U.S. PATENT DOCUMENTS

| | | | |
|---|---|---|---|
| 4,107,061 | 8/1978 | Sturwold et al. | 252/49.3 |
| 4,181,682 | 1/1980 | Watts, Jr. et al. | 564/474 |
| 4,313,764 | 2/1982 | Tracy et al. | 8/129 |
| 4,604,103 | 8/1986 | Cambell | 44/72 |
| 4,631,069 | 12/1980 | Sung | 44/56 |
| 4,643,737 | 2/1987 | Sung et al. | 44/63 |
| 4,643,738 | 2/1987 | Sung et al. | 44/63 |
| 4,689,051 | 8/1987 | Sung | 44/57 |
| 4,747,851 | 5/1988 | Sung et al. | 44/62 |

FOREIGN PATENT DOCUMENTS

1173788 12/1969 United Kingdom .
2175910 12/1986 United Kingdom .

Primary Examiner—William R. Dixon, Jr.
Assistant Examiner—Jerry D. Johnson
Attorney, Agent, or Firm—Robert A. Kulason; James J. O'Loughlin; Louis S. Sorell

[57] ABSTRACT

A novel gasoline-soluble reaction product, a concentrate comprising the reaction product dissolved in a hydrocarbon solvent, and a haze-free, deposit-resistant and ORI-inhibited motor fuel composition comprising the reaction product is described. The reaction product is obtained by reacting a dibasic acid anhydride, a novel diamine containing block copolymers with polyoxyalkylene backbones, and a hydrocarbyl polyamine. Motor fuel compositions containing the reaction product additive of the instant invention are haze-free and show improved deposit-resistance and ORI control in comparison with motor fuels without the reaction product. Motor fuel compositions of the instant invention may optionally comprise a polyolefin polymer/copolymer component having a molecular weight range of about 500–3500.

28 Claims, 2 Drawing Sheets

REACTION PRODUCT ADDITIVE AND ORI-INHIBITED MOTOR FUEL COMPOSITION

CROSS-REFERENCE TO RELATED APPLICATION

This application is a continuation-in-part of copending application Ser. No. 000,230, filed Jan. 2, 1987, now abandoned.

BACKGROUND OF THE INVENTION

1. Field of the Invention

This invention relates to a gasoline-soluble reaction product, to a concentrate comprising the reaction product dissolved in a hydrocarbon solvent, and to a haze-free, deposit-resistant and ORI-inhibited motor fuel composition comprising the reaction product. More particularly, this invention relates to: (i) the reaction product of a dibasic acid anhydride, a novel diamine containing block copolymers with polyoxyalkylene backbones, and a hydrocarbyl polyamine; (ii) a concentrate comprising the reaction product dissolved in a hydrocarbon solvent; and (iii) a haze-free motor fuel composition comprising the reaction product. Motor fuel compositions comprising the reaction product of the instant invention are haze-free, ORI-inhibited, and have a reduced tendency to form deposits.

2. Information Disclosure Statement

Combustion of a hydrocarbonaceous motor fuel in an internal combustion engine generally results in the formation and accumulation of carbon deposits on various parts of the combustion chamber as well as on the fuel intake and exhaust systems of the engine. The presence of deposits in the combustion chamber seriously reduces the operating efficiency of the engine. First, deposit accumulation within the combustion chamber inhibits heat transfer between the chamber and the engine cooling system. This leads to higher temperatures within the combustion chamber, resulting in increases in the end gas temperature of the incoming charge. Consequently, end gas auto-ignition occurs, which causes engine knock. In addition, the accumulation of deposits within the combustion chamber reduces the volume of the combustion zone, causing a higher than design compression ratio in the engine. This, in turn, also results in serious engine knocking. A knocking engine does not effectively utilize the energy of combustion. Moreover, a prolonged period of engine knocking will cause stress fatigue and wear in vital parts of the engine. The above-described phenomenon is characteristic of gasoline powered internal combustion engines. It is usually overcome by employing a higher octane gasoline for powering the engine, and hence has become known as the engine octane requirement increase (ORI) phenomenon. It would therefore be highly advantageous if engine ORI could be substantially reduced or eliminated by preventing deposit formation in the combustion chamber of the engine.

An additional problem common to internal combustion engines relates to the accumulation of deposits in the carburetor which tend to restrict the flow of air through the carburetor at idle and at low speed, resulting in an overrich fuel mixture. This condition also promotes incomplete fuel combustion and leads to rough engine idling and engine stalling. Excessive hydrocarbon and carbon monoxide exhaust emissions are also produced under these conditions. It would therefore be desirable from the standpoint of engine operability and overall air quality to provide a motor fuel composition which minimizes or overcomes the above-described problems.

Deposit-inhibiting additives for use in motor fuel compositions are well known in the art. For example:

Co-assigned U.S. patent application Ser. No. 000,253, filed Jan. 2, 1987, (D#78,650) (Sung et al.) discloses a novel polyoxyalkylene diamine compound of the formula:

where c has a value from about 5–150, b+d has a value from about 5–150, and a+e has a value from about 2–12. Motor fuel compositions comprising the novel polyoxyalkylene diamine, alone or in combination with a polymer/copolymer additive are also disclosed.

Co-assigned U.S. Pat. No. 4,689,051 (Sung) discloses an additive composition useful in improving the storage stability of middle distillate fuel oils, the additive prepared by reacting (i) a hydrocarbon-substituted mono primary amine or a hydrocarbon-substituted mono primary ether amine, (ii) a dibasic acid anhydride, and (iii) an N-alkyl alkylene diamine.

Co-assigned U.S. Pat. No. 4,581,040 (Sung et al.) teaches the use of a reaction product as a deposit inhibitor additive in fuel compositions. The reaction product taught is a condensate product of the process comprising: (i) reacting a dibasic acid anhydride with a polyoxyisopropylenediamine thereby forming a maleamic acid; (ii) reacting the maleamic acid with a polyalkylene polyamine, thereby forming a condensate product; and (iii) recovering the condensate product.

Co-assigned U.S. Pat. No. 4,659,336 (Sung et al.) discloses the use of the mixture of: (i) the reaction product of maleic anhydride, a polyether polyamine containing oxyethylene and oxypropylene ether moieties, and a hydrocarbyl polyamine; and (ii) a polyolefin polymer/copolymer as an additive in motor fuel compositions to reduce engine ORI.

Co-assigned U.S. Pat. No. 4,659,337 (Sung et al.) discloses the use of the reaction product of maleic anhydride, a polyether polyamine containing oxyethylene and oxypropylene ether moieties, and a hydrocarbyl polyamine in a gasoline motor fuel to reduce engine ORI and provide carburetor detergency.

Co-assigned U.S. Pat. No. 4,643,738 (Sung et al.) discloses a motor fuel additive useful in reducing combustion chamber deposits, the additive prepared by reacting a dibasic acid anhydride, a polyoxyisopropylene diamine, and an N-alkyl-alkylene diamine.

Co-assigned U.S. Pat. No. 4,643,737 (Sung et al.) discloses a motor fuel additive useful in reducing combustion chamber deposits, the additive prepared by reacting maleic anhydride, an alpha-hydroxy omega-hydroxy-poly(oxyethylene) poly(oxypropylene) poly(oxyethylene) block copolymer, and an N-alkylalkylene diamine.

Co-assigned U.S. Pat. No. 4,631,069 (Sung) discloses a wear-inhibiting additive for use in alcohol fuel compositions, the additive prepared by reacting a polyoxyisopropylene diamine, a dibasic acid anhydride, and an N-alkyl-alkylene diamine.

U.S. Pat. No. 4,604,103 (Campbell) discloses a motor fuel deposit control additive for use in internal combustion engines which maintains cleanliness of the engine intake system without contributing to combustion chamber deposits or engine octane requirement increase (ORI). The additive disclosed is a hydrocarbyl polyoxyalkylene polyamine ethane of molecular weight range 300-2500 having the formula $$R-(OCH_2CH)_x-OCH_2CH_2-NR''R'''$$
$$\phantom{R-(OCH_2CH)_x}|$$
$$\phantom{R-(OCH_2CH)_x}R'$$

where R is a hydrocarbyl radical of from 1 to about 30 carbon atoms; R' is selected from methyl and ethyl; x is an integer from 5 to 30; and R'' and R''' are independently selected from hydrogen and $-(CH_2CH_2NH-)_y$ H where y is an integer from 0-5.

Conventional additives may cause hazing of the motor fuel. Hazy motor fuels are unacceptable by the public since they may indicate a problem with the fuel, such as the presence of undesired contaminants. It would therefore be desirable to provide a haze-free motor fuel composition which is deposit-resistant and ORI-inhibited.

It is one object of this invention to provide a gasoline-soluble reaction product additive for use in motor fuel compositions. It is another object of this invention to provide a concentrate composition comprising the reaction product additive dissolved in a hydrocarbon solvent. It is yet another object of this invention to provide a haze-free, deposit-resistant and ORI-inhibited motor fuel composition comprising the reaction product.

It is one advantage of this invention that motor fuel compositions of the instant invention are haze-free, ORI-inhibited, and deposit-resistant. It is another advantage of this invention that the reaction product additive of the instant invention is soluble in gasoline and similar motor fuel compositions, and therefore requires no admixing with a solvent prior to introduction into a base motor fuel composition.

It is one feature of this invention that the reaction product additive is gasoline soluble. It is another feature of this invention that the motor fuel composition is haze-free, ORI-inhibited, and deposit-resistant.

SUMMARY OF THE INVENTION

It has been discovered that a composition comprising the reaction product of a dibasic acid anhydride, a novel diamine containing block copolymers with polyalkylene backbones, and a hydrocarbyl polyamine has utility as an ORI inhibitor when employed as a soluble additive in a motor fuel composition. The novel reaction product of the instant invention is obtained by reacting at a temperature of 30° C.-200° C., preferably 90° C.-150° C.: (a) about 1 mole of a dibasic acid anhydride of the formula where $R_1$ is either H or a $C_1$-$C_5$ alkyl radical, preferably H;

(b) 1-2 moles, preferably 1.5 moles of a polyoxyalkylene diamine of the formula $$NH_2-(R_5)_q-[OCHCH_2]_a-[OCHCH_2]_b-[OCH_2CH_2]_c-$$
$$\phantom{NH_2-(R_5)_q-[OCHCH_2]_a}|\phantom{-[OCHCH_2]_b}|$$
$$\phantom{NH_2-(R_5)_q}CH_2CH_3\phantom{a}CH_3$$

$$-[OCH_2CH]_d-[OCH_2CH]_e-(R_6)_r-NH_2$$
$$\phantom{-[OCH_2CH]_d}|\phantom{-[OCH_2CH]_e}$$
$$\phantom{-[OCH_2C}CH_3\phantom{d}CH_2CH_3$$

where $R_5$ and $R_6$ are $C_1$-$C_{12}$ alkylene groups, preferably $C_2$-$C_6$ alkylene groups, q and r are integers having a value of 0 or 1, preferably with q=1 and r=0, c has a value from about 5-150, preferably 8-50, b+d has a value from about 5-150, preferably 8-50, and a+e has a value from about 2-12, preferably 4-8; and (c) 1-2 moles, preferably 1 mole of a hydrocarbyl polyamine which may be either:

(i) a hydrocarbyl polyamine of the formula $$R_2(NH-R_3)_x-NH_2$$

where $R_2$ is a alkyl radical having from about 1-24, preferably about 12-20 carbon atoms, $R_3$ is an alkylene radical having from about 1-6 carbon atoms, and x has a value from about 1-10, preferably 1-5; or (ii) a n-alkyl-alkylene diamine of the formula $$R_4-NH-(CH_2)_n-NH_2$$

where $R_4$ is an aliphatic hydrocarbon radical having from about 1-24, preferably 12-20 carbon atoms and n has a value from about 1-6, preferably having a value of 3.

The instant invention is also directed to a concentrate comprising 1.0-75.0 weight percent, preferably 5.0-35.0 weight percent of the prescribed reaction product dissolved in a hydrocarbon solvent, preferably xylene. In addition, the instant invention is directed to a haze-free motor fuel composition comprising 0.0005-5.0 weight percent, preferably 0.001-1.0, most preferably 0.01-0.1 weight percent of the prescribed reaction product. An additional polymer/copolymer additive with a molecular weight range of 500-3500, preferably 650-2600 may also be employed in admixture with the motor fuel composition of the instant invention in concentrations of 0.001-1.0 wt. %, preferably 0.01-0.5 wt. %.

BRIEF DESCRIPTION OF THE DRAWINGS

Referring now to the drawings.

DETAILED EMBODIMENTS OF THE INVENTION

The reaction product additive of the instant invention is prepared by reacting a dibasic acid anhydride, a diamine containing block copolymers with polyoxyalkylene backbones and a hydrocarbyl polyamine.

The dibasic acid anhydride reactant used to prepare the reaction product is of the formula where $R_1$ is either H or a $C_1$–$C_5$ alkyl radical. Accordingly, dibasic acid anhydrides suitable for use include maleic anhydride; alpha-methyl maleic anhydride; alpha-ethyl maleic anhydride; and alpha, beta-dimethyl maleic anhydride. The preferred dibasic acid anhydride for use is maleic anhydride.

The polyoxyalkylene diamine reactant used to prepare the reaction product is a diamine of the formula where $R_5$ and $R_6$ are $C_1$–$C_{12}$ alkylene groups, preferably $C_2$–$C_6$ alkylene groups, most preferably a propylene or butylene group, q and r are integers having a value of 0 or 1, preferably with q=1 and r=0, c has a value from about 5–150, preferably 8–50, b+d has a value from about 5–150, preferably 8–50, and a+e has a value from about 2–12, preferably 4–8. The novelty of the prescribed polyoxyalkylene diamine reactant resides in the fact that it contains a large number (5–150, preferably 8–50) of polyoxypropylene ether moieties in combination with a smaller number (2–12, preferably 4–8) of polyoxybutylene ether moieties. In the most preferred embodiment, q=1, r=0, $R_5$ is a butylene group, and the polyoxyalkylene diamine reactant is therefore of the formula where c has a value of 8–50, b+d has a value of 8–50, and a+c has a value of 2–12.

The method of synthesis of the prescribed polyoxyalkylene diamine reactant is set forth in detail in co-assigned U.S. patent application Ser. No. 000,253, and incorporated herein by reference. The best mode of synthesizing the preferred polyoxyalkylene diamine reactant is set forth in Example I, below.

Example I

Synthesis of Novel Polyoxyalkylene Diamine Reactant

A. Preparation of Polyol Precursor

Ten pounds of a polyethylene glycol of an approximate molecular weight of 600 and 100 g of 45% aqueous KOH were charged into a ten-gallon reactor, which was then purged with prepurified nitrogen. While maintaining a nitrogen purge, the reactor was heated to 100° C., and the initiator was then dried to a water content of less than 0.1% by vacuum stripping followed by nitrogen stripping. Thereafter, 19.1 lb of ethylene oxide was charged and reacted at 105°–110° C. and 50 psig for 1.25 hours. Without digestion, 26.2 lb of propylene oxide was then charged and reacted at 105°–110° C. and 50 psig over a 3 hour period.

The reaction mixture was thereafter heated to about 120° C., and 2.9 lb. of butylene oxide was added over a 30 minute period. After a 2 hour digestion period, the alkaline polyol was neutralized by stirring for 2 hours with 360 g of MAGNESOL 30/40, which was added as an aqueous slurry. To stabilize the material, 26.4 g of di-t-butyl p-cresol was added. The neutralized product was then vacuum stripped to about 5 mm Hg pressure, nitrogen stripped, and filtered. The finished product had the following properties:

| | |
|---|---|
| Acid no., mg KOH/g | 0.01 |
| Hydroxyl no., mg KOH/g | 35 |
| Water, wt % | 0.01 |
| pH in 10:6 isopropanol-water | 8.1 |
| Color, Pt—Co | 40 |
| Sodium, ppm | 0.2 |
| Potassium, ppm | 0.2 |
| Peroxide, ppm | 1.1 |
| Viscosity, °F., cc | |
| 77 | 988 |
| 100 | 513 |

B. Amination Reaction 0.6 lb/hr of the polyol, 1.2 lb/hr of ammonia, and 36 liter/hr of hydrogen were fed into a 1250 ml tubular reactor filled with a nickel-chromium-copper metal and metal oxide catalyst which was kept at 200° C. and 2000 psig. The reactor effluent was stripped at 100° C. and 10mm Hg vacuum. The resulting polyether polyamine product had the following physical properties:

| | |
|---|---|
| Total acetylatables, meq/g | 0.615 |
| Total amine, meq/g | 0.56 |
| Primary amine, meq/g | 0.54 |
| Water, wt % | 0.09 |
| Color, Pt—Co | 30 |
| Flash Point, PMCC | 440° F. |
| Melting point, °C. | 27–31 |

The hydrocarbyl polyamine reactant used to prepare the reaction product may be either:
(i) a hydrocarbyl polyamine of the formula $$R_2(NH-R_3)_x-NH_2$$

where $R_2$ is an alkyl radical having from about 1–24, preferably 12–20 carbon atoms, $R_3$ is an alkylene radical having from about 1–6 carbon atoms, and x has a value from 1–10, preferably 1–5; or
(ii) a n-alkyl-alkylene diamine of the formula $$R_4-NH-(CH_2)_n-NH_2$$

where $R_4$ is an aliphatic hydrocarbon radical having from about 1 to 24 carbon atoms, preferably from about 12 to 20 carbon atoms, and n has a value from about 1 to 6, preferably having a value of 3. N-alkyl-alkylene diamines suitable for use in preparing the reaction product of the instant invention include aliphatic diamines commercially available from Akzo Chemie America Co. under the DUOMEEN series trade name. Examples of such n-alkyl-alkylene diamines include n-coco-1,3-diaminopropane (DUOMEEN C), n-soya-1,3-diaminopropane (DUOMEEN S), n-tallow-1,3-diaminopropane (DUOMEEN T), and n-oleyl-1,3-diaminopropane (DUOMEEN OL). The most preferred n-alkylalkylene diamine reactant for use in preparing the reaction product is n-tallow-1,3 diaminopropane.

The reaction product is prepared by first reacting about 1 mole of dibasic acid anhydride with about 1 to 2 moles, preferably 1.5 moles of the prescribed novel diamine containing block copolymers with polyoxyethylene, polyoxypropylene and polyoxybutylene backbones at a temperature of 30° C.–° C., preferably 90° C.–150° C. The reaction of dibasic acid anhydride with the novel polyoxyalkylene diamine is preferably carried out in the presence of a solvent. A preferred solvent is one which will distill with water azeotropically. Suitable solvents include hydrocarbons boiling in the gasoline boiling range of about 30° C. to about 200° C. Generally, this will include saturated and unsaturated hydrocarbons having from about 5 to about 10 carbon atoms. Specific suitable hydrocarbon solvents include hexane, cyclohexane, benzene, toluene, and mixtures thereof. Xylene is the preferred solvent. The solvent can be present in an amount of up to about 90% by weight of the total reaction mixture. The reaction mixture is thereafter cooled to 50° C.–75° C., preferably 60° C., and 1–2 moles, preferably 1 mole of the hydrocarbyl polyamine is added. The new mixture is then reacted at 30° C.–200° C., preferably 90° C.–150° C.

In the best mode of preparing the reaction product of the instant invention, about 1 mole of maleic anhydride and about 1.5 moles of the prescribed polyoxyalkylene diamine where c has a value of 8–50, b+d has a value of 8–50, and a+e has a value of 4–8 are combined with the solvent xylene and reacted at a temperature of about 100° C. The reaction mixture is maintained at this temperature for approximately 2 hours. The mixture is then cooled to about 60° C., whereupon about 1 mole of the hydrocarbyl polyamine n-tallow-1,3 diaminopropane is added. The new mixture is then reacted at about 140° C. for reflux and azeotroping for 5 hours, with about 1 to 1.5 moles of water being removed. The reaction product can then be separated from the solvent using conventional means, or left in admixture with some or all of the solvent.

A critical feature of the reaction product composition of the instant invention is the presence of a large number (5–150, preferably 8–50) of polyoxypropylene ether moieties in combination with more limited numbers (2–12, preferably 4–8) of polyoxybutylene ether moieties. These moieties are provided by the prescribed novel polyoxyalkylene diamine reactant. In particular, the presence of a large number of polyoxypropylene ether moieties enhances the gasoline solubility of the reaction product, thus increasing the efficacy of the reaction product as an additive in motor fuel compositions. The reaction product additive of the instant invention is advantageous over other ORI-controlling motor fuel additives such as those disclosed in U.S. patent application Ser. Nos. 845,719 and 821,727, in that the reaction product of the instant invention is soluble in gasoline and similar motor fuel compositions, and therefore requires no admixing with a solvent prior to introduction into a base motor fuel composition. In addition, the presence of polyoxybutylene ether moieties in the reaction product of the instant invention has been found to prevent hazing in a motor fuel composition of the instant invention.

The following examples illustrate the preferred method of preparing the novel reaction product of the instant invention. It will be understood that the following examples are merely illustrative, and are not meant to limit the invention in any way. In the examples, all parts are parts by weight unless otherwise specified.

Example II

A reaction product was formed by reacting 54 parts of maleic anhydride, 3265 parts of xylene, and 3000 parts of a polyoxyalkylene diamine at 100° C. for 2 hours. The polyoxyalkylene diamine was of the formula where c had an approximate value of 40.5, b+d had an approximate value of 40.5, and a+e had an approximate value of 2.5.

The mixture was thereafter cooled to about 60.C, and 54 parts of n-tallow-1,3 diaminopropane (DUOMEEN T) were added. The new mixture was then reacted at about 140° C. for 5 hours to produce the final reaction product. The final reaction product was then filtered and stripped of remaining solvent under vacuum.

Example III

A reaction product is formed by reacting 54 parts of maleic anhydride, 3206 parts of xylene, and 3000 parts of a polyoxyalkylene diamine at 100° C. for 2 hours. The polyoxyalkylene diamine is of the formula where c has an approximate value of 40.5, b+d has an approximate value of 40.5, and a+e has an approximate value of 2.5.

The mixture is thereafter cooled to about 60° C., and 152 parts of n-coco-1,2 diaminopropane (DUOMEEN C) are added. The new mixture is then reacted at about 140° C. for 5 hours to produce the final reaction product. The final reaction product is then filtered and stripped of remaining solvent under vacuum.

Example IV

A reaction product is formed by reacting 54 parts of maleic anhydride, 3231 parts of xylene, and 3000 parts of a polyoxyalkylene diamine at 100° C. for 2 hours. The polyoxyalkylene diamine is of the formula where c has an approximate value of 40.5, b+d has an approximate value of 40.5, and a+e has an approximate value of 2.5.

The mixture is thereafter cooled to about 60° C., and 176 parts of n-oleyl-1,3 diaminopropane (DUOMEEN OL) are added. The new mixture is then reacted at about 140° C. for 5 hours to produce the final reaction product. The final reaction product is then filtered and stripped of remaining solvent under vacuum.

It has been found that a motor fuel composition containing 0.0005-5.0 weight percent, preferably 0.001-1.0 preferably 0.01-0.1 weight percent of the reaction product of the instant invention is surprisingly effective in minimizing and reducing the ORI of a gasoline internal combustion engine. This improvement has been demonstrated in engine tests where the performance characteristics of a base motor fuel composition containing a commercial fuel additive and an improved motor fuel composition of the instant invention were compared. The specific engine tests were made on a 2.0 liter 1983 Chevrolet four cylinder engine (Chevy Test). This test correlates well with results obtained via road simulation tests.

The base motor fuel employed in the tests (herein designated as Base Fuel A) was a premium grade gasoline essentially unleaded (less than 0.05 g.of tetraethyl lead per gallon), and comprised a mixture of hydrocarbons boiling in the gasoline boiling range consisting of about 22% aromatic hydrocarbons, 11% olefinic carbons, and 67% paraffinic hydrocarbons, boiling in the range from about 90° F. to 450° F. In preparing motor fuels for the Chevy Test, a suitable amount of the reaction product of the instant invention was added directly to Base Fuel A without any hazing of the motor fuel composition, and without additional solvents being necessary. As previously stated, the gasoline solubility of the reaction product of the instant invention is attributed to the presence of a large number of polyoxypropylene ether moieties in combination with polyoxyethylene and polyoxybutylene ether moieties. The haze-free property of the motor fuel composition comprising the reaction product is attributed to the presence of the polyoxybutylene ether moieties.

The ORI tendencies of Base Fuel A containing 60 PTB of a commercial fuel additive (60 pounds of reaction product per 1000 barrels of gasoline, equivalent to about 0.02 weight percent of reaction product based on the weight of the fuel composition), as well as Base Fuel A containing 100 PTB of the reaction product of Example II (100 pounds of reaction product per 1000 barrels of gasoline, equivalent to about 0.033 weight percent of reaction product based upon the weight of the fuel composition) were measured using the Chevy Test. The Chevy Test employs a 2.0 liter 1983 Chevrolet in-line four cylinder engine with a cast alloy iron cylinder head having separate intake and exhaust ports for each cylinder. An electronically controlled fuel injection system maintains the required fuel flow to each engine cylinder by monitoring various engine operating parameters (e.g. manifold absolute pressure, throttle valve position, coolant temperature, engine r.p.m., and exhaust gas oxygen content) and adjusting the fuel flow accordingly. The fuel system supplying fuel to the engine is specifically adapted for the determination of engine ORI. At the beginning of the engine rating procedure, a fuel with an octane rating high enough to ensure that no audible engine knock is present is employed. The next lower octane fuel is then switched with the previous fuel, and this procedure continues until a knock becomes audible. The difference between the octane level at knock and no-knock conditions is the engine ORI. Engine ORI was determined as a function of hours of engine operation for both Base Fuel A containing 100 PTB of reaction product, and for Base Fuel A containing 60 PTB of a typical commercial motor fuel additive.

Figure 1:
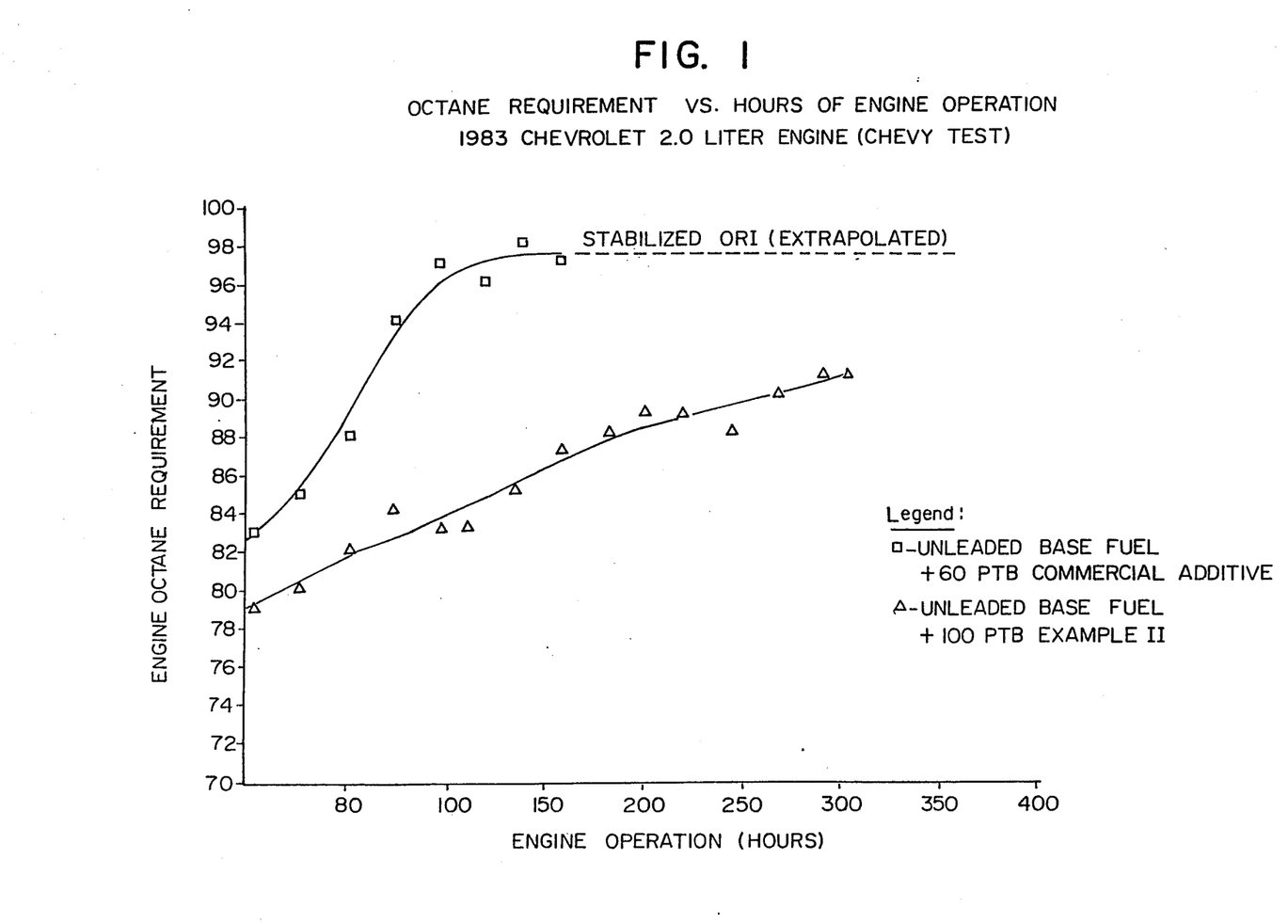
FIG. 1 is a graphical representation of data obtained which compares the octane requirement (as a function of hours of engine operation) of a 1983 Chevrolet 2.0 liter engine using an unleaded base fuel containing 60 PTB of a commercial fuel additive, and the identical engine using a motor fuel composition of the instant invention which is an unleaded base fuel containing 100 PTB of the reaction product of the instant invention, as exemplified by Example II.

The experimental results obtained from the Chevy Test for Base Fuel A containing 60 PTB of commercial fuel additive and Base Fuel A containing 100 PTB of the reaction product of the instant invention (Example II) are set forth in FIG. 1. As illustrated by FIG. 1, the octane requirement of the engine using Base Fuel A containing 60 PTB of commercial fuel additive was consistently higher than the corresponding octane requirement of the engine using Base Fuel A containing 100 PTB of Example II over the duration of the test. The data set forth in FIG. 1 thus indicate that the reaction product of the instant invention is more effective as an ORI controlling additive in a motor fuel composition than a typical commercially available motor fuel composition.

The motor fuel composition of the instant invention comprises a major amount of a base motor fuel and 0.0005–5.0 weight percent, preferably 0.001–1.0, most preferably 0.01–0.1 weight percent of the above-described reaction product. Preferred base motor fuel compositions for use with the reaction product additive are those intended for use in spark ignition internal combustion engines. Such motor fuel compositions, generally referred to as gasoline base stocks, preferably comprise a mixture of hydrocarbons boiling in the gasoline boiling range, preferably from about 90° F. to about 450° F. This base fuel may consist of straight chains or branched chains or paraffins, cycloparaffins, olefins, aromatic hydrocarbons, or mixtures thereof. The base fuel can be derived from, among others, straight run naphtha, polymer gasoline, natural gasoline, or from catalytically cracked or thermally cracked hydrocarbons and catalytically reformed stock. The composition and octane level of the base fuel are not critical and any conventional motor fuel base can be employed in the practice of this invention. In addition, the motor fuel composition may contain any of the additives generally employed in gasoline. Thus, the fuel composition can contain anti-knock compounds such as tetraethyl lead compounds, anti-icing additives, upper cylinder lubricating oils, and the like.

The motor fuel composition of the instant invention may additionally comprise a polymeric component, present in a concentration ranging from about 0.001–1.0 weight percent, preferably 0.01–0.5 weight percent, based on the total weight of the motor fuel composition. The polymeric component may be a polyolefin polymer, copolymer, or corresponding hydrogenated polymer or copolymer of a $C_2$–$C_6$ unsaturated hydrocarbon. The polymer component is prepared from monoolefins and diolefins, or copolymers thereof, having an average molecular weight in the range from abut 500–3500, preferably about 650–2600. Mixtures of olefin polymers with an average molecular weight falling within the foregoing range are also effective. In general, the olefin monomers from which the polyolefin polymer component is prepared are unsaturated $C_2$–$C_6$ hydrocarbons. Specific olefins which may be employed to prepare the polyolefin polymer component include ethylene, propylene, isopropylene, butylene, isobutylene, amylene, hexylene, butadiene, and isoprene. Propylene, isopropylene, butylene, and isobutylene are particularly preferred for use in preparing the polyolefin polymer component. Other polyolfins which may be employed are those prepared by cracking polyolefin polymers or copolymers of high molecular weight to a polymer in the above-noted molecular weight range. Derivatives of the noted polymers obtained by saturating the polymers by hydrogenation are also effective and are a part of this invention. The word "polymers" is intended to include the polyolefin polymers and their corresponding hydrogenated derivatives.

The average molecular weight range of the polymer component is a critical feature. The polyolefin polymer, copolymer, or corresponding hydrogenated polymer or copolymer component may have an average molecular weight in the range from abut 500–3500, preferably from about 650–2600. The most preferred polymer components for use in the instant invention are polypropylene with an average molecular weight in the range of about 750–1000, preferably about 800, and polyisobutylene with an average molecular weight in the range of about 1000–1500, preferably about 1300. The polymer component, if employed, enhances the ORI reduction of the instant invention, and additionally provides enhanced cleanliness at the engine intake valves and ports.

Examples V and VI, set forth below, are illustrative of motor fuel compositions of the instant invention comprising the above-described reaction product and polymer components. It will be understood that the following examples are merely illustrative, and are not meant to limit the invention in any way.

EXAMPLE V

A motor fuel composition was obtained by mixing with Base Fuel A about 100 PTB of the reaction product component set forth in Example II (equivalent to about 0.033 wt. %) and about 150 PTB of polypropylene polymer component of a molecular weight of about 800 (equivalent to about 0.05 wt. %).

EXAMPLE VI

A motor fuel composition was obtained by mixing with Base Fuel A about 30 PTB of the reaction product component set forth in Example II (equivalent to about 0.01 wt. %) and about 150 PTB of polyisobutylene of a molecular weight of about 1300 (equivalent to about 0.05 wt. %).

Figure 2:
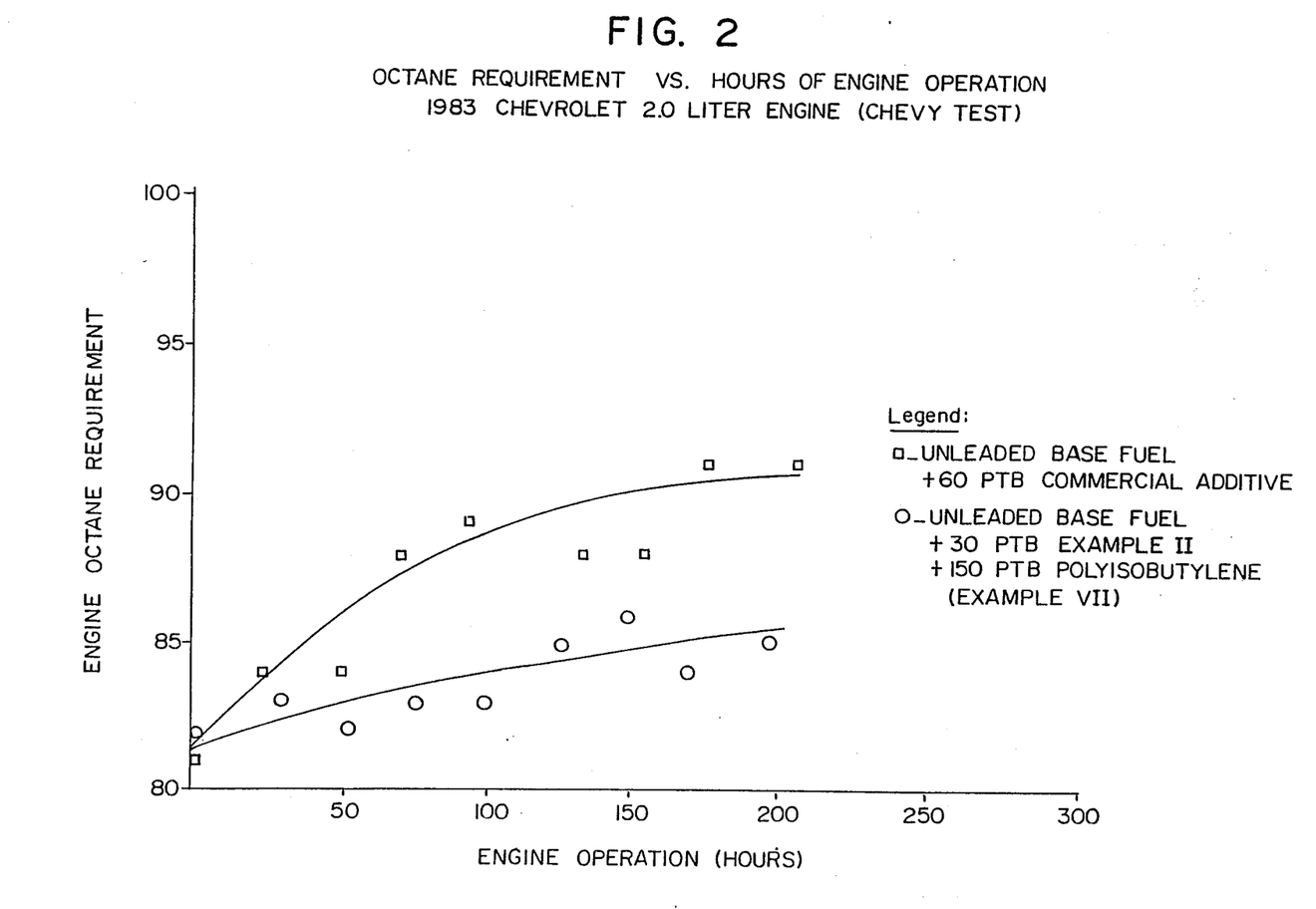
FIG. 2 is a graphical representation of data obtained which compares the octane requirement (as a function of hours of engine operation) of a 1983 Chevrolet 2.0 liter engine using an unleaded base fuel containing 60 PTB of a commercial fuel additive, and the identical engine using a motor fuel composition of the instant invention, as exemplified by Example VI, which is an unleaded base fuel containing 30 PTB of the reaction product of the instant invention, as exemplified by Example II, in combination with 150 PTB of polyisobutylene of a molecular weight of about 1300.

Chevy Test data comparing ORI for Base Fuel A containing 60 PTB of commercial fuel additive and a motor fuel composition of the instant invention (Example VI), which is Base Fuel A containing 30 PTB of the reaction product of Example II combined with 150 PTB of polyisobutylene of a molecular weight of about 1300 are set forth in FIG. 2. As illustrated by FIG. 2, the octane requirement of the engine using Base Fuel A containing 60 PTB of commercial fuel additive was consistently higher than the corresponding octane requirement of the engine using a motor fuel composition of the instant invention over the duration of the test. The data set forth in FIG. 2 thus indicate that the reaction product of the instant invention, in admixture with the prescribed optional polymer component, is more effective as an ORI controlling additive in a motor fuel composition than a typical commercially available motor fuel composition.

For convenience in shipping and handling, it is useful to prepare a concentrate of the reaction product additive which may be added to a base motor fuel to produce the motor fuel composition of the instant invention. The concentrate may be prepared in a suitable liquid solvent containing from about 1.0–75.0 weight percent, preferably 5.0–35.0 weight percent of the additive component or components: namely, the above-described novel reaction product either alone or in combination with the above-described additional polymer component. Suitable solvents for use in the concentrate include hydrocarbon solvents such as toluene and xylene, with xylene being preferred.

It will be evident that the terms and expressions employed herein are used as terms of description and not of limitation. There is no intention, in the use of these descriptive terms and expressions, of excluding equivalents of the features described and it is recognized that various modifications are possible within the scope of the invention claimed.

The invention claimed is:

1. A composition comprising the reaction product obtained by reacting at a temperature of 30° C.–200° C.:
   (a) about 1 mole of a dibasic acid anhydride of the formula where $R_1$ is either H or a $C_1$–$C_5$ alkyl radical;
   (b) 1–2 moles of a polyoxyalkylene diamine of the formula where $R_5$ and $R_6$ are $C_1$–$C_{12}$ alkylene groups, q and r are integers having a value of 0 or 1, c has a value from about 5–150, b+d has a value from about 5–150, and a+e has a value from about 2–12; and
   (c) 1–2 moles of a hydrocarbyl polyamine which may be either
   (i) a hydrocarbyl polyamine of the formula $$R_2(NH-R_3)_x-NH_2$$

where $R_2$ is a alkyl radical having from about 1–24 carbon atoms, $R_3$ is an alkylene radical having from about 1–6 carbon atoms, and x has a value from about 1–10; or
   (ii) a n-alkyl-alkylene diamine of the formula where $R_4$ is an aliphatic hydrocarbon radical having from about 1–24 carbon atoms and n has a value from about 1–6.

2. A composition according to claim 1, in which said reaction product is obtained by reacting about 1 mole of said dibasic acid anhydride with about 1.5 moles of said polyoxyalkylene diamine and about 1 mole of said hydrocarbyl polyamine.

3. A composition according to claim 1, where said dibasic acid anhydride reactant is maleic anhydride.

4. A composition according to claim 1, where said polyoxyalkylene diamine reactant is of the formula where c has a value from about 8–50, b+d has a value from about 8–50, and a+e has a value from about 4–8.

5. A composition according to claim 1, where said hydrocarbyl polyamine reactant is either:
   (i) a hydrocarbyl polyamine of the formula where $R_2$ is an alkyl radical having from about 12–20 carbon atoms, $R_3$ is an alkylene radical having from about 1–6 carbon atoms, and x has a value from 1–5; or
   (ii) a n-alkyl-alkylene diamine of the formula where $R_4$ is an aliphatic hydrocarbon radical having from about 12–20 carbon atoms, and n has a value of 3.

6. A composition according to claim 5, where said n-akyl-alkylene diamine reactant is selected from the group consisting of
   n-coco-1,3-diaminopropane;
   n-soya-1,3-diaminopropane;
   n-tallow-1,3-diaminopropane; and
   n-oleyl-1,3-diaminopropane.

7. A composition according to claim 6, where said n-alkyl-alkylene diamine reactant is n-tallow-1,3 diaminopropane.

8. A concentrate composition comprising 1.0–75.0 weight percent of the reaction product of any of claims 1–7 in admixture with a hydrocarbon solvent.

9. A concentrate composition comprising 5.0–35.0 weight percent of the reaction product of any of claims 1–7 in admixture with a hydrocarbon solvent.

10. A motor fuel composition comprising a mixture of hydrocarbons boiling in the range from about 90° F.–450° F. and from 0.0005–5.0 weight percent of the reaction product obtained by reacting at a temperature of 30° C.–200° C.: (a) about 1 mole of a dibasic acid anhydride of the formula $$\begin{array}{c} R_1-C-C \\ \parallel \quad \diagdown \\ \quad \quad O \\ \quad \quad \diagup \\ R_1-C-C \\ \parallel \\ O \end{array}$$

where $R_1$ is H or a $C_1$–$C_5$ alkyl radical;
(b) 1–2 moles of a polyoxyalkylene diamine of the formula $$NH_2-(R_5)_q-[OCHCH_2]_a-[OCHCH_2]_b-[OCH_2CH_2]_c- \atop \phantom{NH_2-(R_5)_q-[OCHCH_2]_a-[}CH_2CH_3 \phantom{]_b-[OCH_2CH_2]_c}CH_3$$

$$-[OCH_2CH]_d-[OCH_2CH]_e-(R_6)_r-NH_2 \atop \phantom{-[OCH_2CH]_d}CH_2CH_3\phantom{-[OCH_2CH]_e-(R_6)_r-NH_2} \atop \phantom{-[OCH_2CH]_d-[OCH_2CH]_e-(R_6)_r-}CH_3$$

where $R_5$ and $R_6$ are $C_1$–$C_{12}$ alkylene groups, q and r are integers having a value of 0 or 1, c has a value from about 5–150, b+d has a value from about 5–150, and a+e has a value from about 2–12; and
(c) 1–2 moles of a hydrocarbyl polyamine which may be either
(i) a hydrocarbyl polyamine of the formula $$R_2(NH-R_3)_x-NH_2$$

where $R_2$ is a alkyl radical having from about 1–24 carbon atoms, $R_3$ is an alkylene radical having from about 1–6 carbon atoms, and x has a value from about 1–10; or
(ii) a n-alkyl-alkylene diamine of the formula $$R_4-NH-(CH_2)_n-NH_2$$

where $R_4$ is an aliphatic hydrocarbon radical having from about 1–24 carbon atoms and n has a value from about 1–6.

11. A motor fuel composition according to claim 10, in which said reaction product additive is obtained by reacting about 1 mole of said dibasic acid anhydride with about 1.5 moles of said polyoxyalkylene diamine and about 1 mole of said hydrocarbyl polyamine.

12. A motor fuel composition according to claim 10 where said dibasic acid anhydride reactant is maleic anhydride.

13. A composition according to claim 10, where said polyoxyalkylene diamine reactant is of the formula $$NH_2CHCH_2-[OCHCH_2]_a-[OCHCH_2]_b-[OCH_2CH_2]_c-[OCH_2CH]_d-[OCH_2CH]_e-NH_2 \atop \phantom{NH_2}CH_2CH_3 \phantom{-[OCHCH_2]_a}CH_2CH_3 \phantom{-[OCHCH_2]_b-[OCH_2CH_2]_c-[OCH_2CH]_d-[OCH_2CH]_e}CH_2CH_3 \atop \phantom{NH_2CHCH_2-[OCHCH_2]_a-}CH_3 \phantom{[OCHCH_2]_b-[OCH_2CH_2]_c-[OCH_2CH]_d}CH_3$$

and c has a value from about 8–50, b+d has a value from about 8–50, and a+e has a value from about 4–8.

14. A composition according to claim 10, where said hydrocarbyl polyamine reactant is either:
(i) a hydrocarbyl polyamine of the formula $$R_2(NH-R_3)_x-NH_2$$

where $R_2$ is an alkyl radical having from about 12–20 carbon atoms, $R_3$ is an alkylene radical having from about 1–6 carbon atoms, and x has a value from 1–5; or
(ii) a n-alkyl-alkylene diamine of the formula $$R_4-NH-(CH_2)_n-NH_2$$

where $R_4$ is an aliphatic hydrocarbon radical having from about 12–20 carbon atoms, and n has a value of 3.

15. A motor fuel composition according to claim 14, where said n-alkyl-alkylene diamine reactant is selected from the group consisting of
n-coco-1,3-diaminopropane;
n-soya-1,3-diaminopropane;
n-tallow-1,3-diaminopropane; and
n-oleyl-1,3-diaminopropane.

16. A motor fuel composition according to claim 15, where said n-alkyl-alkylene diamine reactant is n-tallow-1,3 diaminopropane.

17. A motor fuel composition according to any of claims 10–16 comprising from about 0.001–1.0 weight percent of said reaction product additive.

18. A motor fuel composition according to any of claims 10–16 containing from about 0.01–0.1 weight percent of said reaction product additive.

19. A motor fuel composition according to claim 10 which additionally comprises from about 0.001–1.0 weight percent of a polyolefin polymer, copolymer, or the corresponding hydrogenated polymer or copolymer, or mixtures thereof, of a $C_2$–$C_6$ unsaturated hydrocarbon, said polyolefin polymer or copolymer having a molecular weight in the range from about 500–3500.

20. A motor fuel composition according to claim 19, in which said polyolefin polymer or copolymer component is derived from an unsaturated hydrocarbon selected from the group consisting of ethylene, propylene, isopropylene, butylene, isobutylene, amylene, hexylene, isoprene, and butadiene.

21. A motor fuel composition according to claim 20, in which said polyolefin polymer, copolymer, or corresponding hydrogenated polymer or copolymer component has a molecular weight in the range of about 650–2600.

22. A motor fuel composition according to claim 21, in which said polyolefin polymer component is a polypropylene having a molecular weight in the range of about 750–1000.

23. A motor fuel composition according to claim 22, where said polyolefin polymer component is a polypropylene with an average molecular weight of about 800.

24. A motor fuel composition according to claim 21, in which said polyolefin polymer component is a polyisobutylene having a molecular weight in the range of about 1000–1500.

25. A motor fuel composition according to claim 24, in which said polyolefin polymer component is a polyisobutylene having an average molecular weight of about 1300.

26. A motor fuel composition according to any of claims 19-25, comprising from about 0.01-0.5 weight percent of said polyolefin polymer or copolymer component.

27. A motor fuel composition comprising a mixture of hydrocarbons boiling in the range from about 90° F.-450° F. and from about 0.001-1.0 weight percent of the reaction product obtained by reacting, at a temperature of 90° C.-150° C.

(a) about 1 mole of maleic anhydride;
(b) about 1.5 moles of a polyoxyalkylene diamine of the formula where c has a value from about 8-50, b+d has a value from about 8-50, and a+e has a value from about 4-8; and (c) about 1 mole of the n-alkyl-alkylene diamine n-tallow-1,3 diaminopropane.

28. A motor fuel composition comprising a mixture of hydrocarbons boiling in the range from about 90° F.-450° F., and additionally comprising:

(I) from about 0.001-1.0 weight percent of the reaction product obtained by reacting, at a temperature of 90° C.-150° C.
  (a) about 1 mole of maleic anhydride;
  (b) about 1.5 moles of a polyoxyalkylene diamine of the formula where c has a value from about 8-50, b+d has a value from about 8-50, and a+e has a value from about 4-8;
  (c) about 1 mole of the n-alkyl-alkylene diamine n-tallow-1,3 diaminopropane; and (II) from about 0.01-0.5 weight percent of polyisobutylene of a molecular weight of about 1300.

* * * * *